United States Patent [19]

Singerman

[11] Patent Number: 5,653,917

[45] Date of Patent: Aug. 5, 1997

[54] RUST-REMOVING ALKALI METAL HYDROGEN CITRATE COMPOSITION

[76] Inventor: Gary M. Singerman, 38 Falling Star Ct., The Woodlands, Tex. 77381

[21] Appl. No.: 541,495

[22] Filed: Oct. 10, 1995

Related U.S. Application Data

[63] Continuation of Ser. No. 267,382, Jun. 29, 1994, abandoned.

[51] Int. Cl.$^6$ .................... C09K 15/06; C02F 5/10
[52] U.S. Cl. .................. 252/389.62; 252/180; 510/247; 134/3
[58] Field of Search .................... 252/180, 383, 252/387, 389.62, 82, 388; 510/247; 134/2, 3, 28

[56] References Cited

U.S. PATENT DOCUMENTS

| | | | |
|---|---|---|---|
| 2,428,364 | 6/1947 | Frager | 134/2 |
| 3,173,864 | 3/1965 | Facedman | 210/57 |
| 3,510,432 | 5/1970 | Squire | 252/146 |
| 3,886,069 | 5/1975 | Trondheim | 210/46 |
| 3,970,594 | 7/1976 | Claybaugh | 252/524 |
| 3,993,575 | 11/1976 | Howanitz et al. | 252/142 |
| 4,367,092 | 1/1983 | Ungens | 252/148 |
| 4,529,450 | 7/1985 | Panayappan | 134/4 |
| 4,540,443 | 9/1985 | Barber | 252/80 |
| 4,668,293 | 5/1987 | Tait et al. | 252/396 |
| 4,824,589 | 4/1989 | Magyar et al. | 252/82 |
| 4,855,069 | 8/1989 | Schuppiser et al. | 252/82 X |
| 5,108,544 | 4/1992 | Hakansson | 134/41 |
| 5,342,537 | 8/1994 | Conville et al. | 252/174.24 |

FOREIGN PATENT DOCUMENTS

| | | | |
|---|---|---|---|
| 1532057 | 7/1968 | France. | |
| 49119 | 7/1966 | Germany. | |
| 47651 | 3/1989 | Hungary. | |
| 56-72163 | 6/1981 | Japan | C23C 1/08 |
| 0222588 | 12/1984 | Japan. | |
| 1203722 | 9/1970 | United Kingdom. | |

*Primary Examiner*—Stephen Kalafut
*Assistant Examiner*—Cephia Toomer
*Attorney, Agent, or Firm*—Mary J. Gaskin

[57] ABSTRACT

A rust-removing composition comprises alkali metal hydrogen citrates, water, optionally citric acid, and optionally a thickener. The invention further provides a method for removing rust from rusted metal surfaces, concrete surfaces, and the siliceous surfaces of natural stone by applying the composition, allowing contact until substantially all of the rust is removed, and washing away the composition and dissolved rust with water.

12 Claims, No Drawings

RUST-REMOVING ALKALI METAL HYDROGEN CITRATE COMPOSITION

This application is a continuation of application Ser. No. 08/267,382 filed on Jun. 29, 1994, now abandoned.

BACKGROUND—FIELD OF INVENTION

This invention relates to Compositions for use in removing rust from metal surfaces, concrete surfaces, and the siliceous surfaces of natural stone.

BACKGROUND—DESCRIPTION OF PRIOR ART

Prior art rust removers often contain highly acidic, corrosive and caustic chemicals such as hydrochloric acid (muriatic acid) or phosphoric acid. Both of these acids are classified as poisons under the U.S. Federal Caustic Poison Act. When disposing of them, both must be treated as hazardous waste, according to U.S. Environmental Protection Agency regulations.

Hydrochloric acid is highly toxic and corrosive. The liquid and mist can cause severe burns to all body tissue. Permanent visual damage, including blindness, can occur. Dermatitis and photosensitization may result from contact. Inhalation causes coughing and choking; inflammation and ulceration of the respiratory tract may occur. If ingested, it causes corrosion of mucous membranes, the esophagus and stomach. Dysphagia (difficulty in swallowing), nausea, vomiting, circulatory collapse and death may occur from ingestion. These are the attributes of hydrochloric acid which is concentrated enough to be an effective rust remover. However, it attacks and dissolves clean base metal and concrete as well as rust. If diluted with water to the point where it might be relatively safe to use in a consumer product (less than 2%), it is no longer an effective rust remover.

Concentrated solutions of phosphoric acid are likewise extremely destructive to mucous membranes and the upper respiratory tract, the eyes and skin. Disposal of waste phosphoric acid is a serious environmental problem. If allowed to enter the environment, it can collect as phosphate in bodies of water, causing or accelerating algae bloom. Even more hazardous prior art rust removers contain both phosphoric acid and sulfuric acid, sulfuric acid being even more acidic and corrosive than phosphoric acid.

A prior art rust remover for removal of rust from coarse siliceous surfaces of natural stone comprises mixtures of phosphoric acid, hydrofluoric acid, a surfactant, and water. Another discloses a mixture comprised of hydrofluoric acid, sodium fluoride, and water to remove rust on building materials. Still another discloses a mixture containing 20 wt. % phosphoric acid and 0.1 wt. % wetting agent in water to remove rust from natural stone. Hydrofluoric acid is highly toxic and corrosive. It can cause severe irritation and destruction of the eyes, extreme irritation of the respiratory tract, and if ingested can cause circulatory collapse and death. Sodium fluoride likewise is highly toxic, even though 2% solutions of it are applied directly to teeth for prophylaxis of dental caries. It has been used as an insecticide, particularly for roaches and ants, and was once used as the poison in coyote and wolf baits. Severe symptoms result from human ingestion of 0.25 to 0.45 g. Death results from ingestion of 4 g.

Other prior art rust removers contain oxalic acid or mixtures of phosphoric acid and oxalic acid. Oxalic acid, being toxic and corrosive, is harmful if swallowed, inhaled, or absorbed through the skin. It is extremely destructive to tissue of the mucous membranes and upper respiratory tract, eyes and skin. Inhalation may be fatal as a result of spasm, inflammation and edema (swelling) of the larynx and bronchi, chemical pneumonitis and pulmonary edema (fluid in the lungs). Target organs are the kidneys and nerves.

Given the hazards of the foregoing rust removers, attempts have been made to formulate safer rust removers. U.S. Pat. No. 2,428,364 to Frager discloses a solution of ammonium citrate or ammonium tartrate followed by treatment with dilute alkaline sodium nitrite, and finally by treatment with a soluble oil emulsion to remove rust from metal surfaces. This patent refers to ammonium citrate and ammonium tartrate with no mention of how they were prepared and no definition of their specific chemical composition. Therefore this prior art reference is vague and should be construed narrowly. One can only assume that by common nomenclature usage and understanding this patent refers specifically to the fully neutralized salts, triammonium citrate and diammonium tartrate. Such fully neutralized salts are not as effective in removing rust as are the partially neutralized salts such as diammonium hydrogen citrate or monoammonium hydrogen citrate.

U.S. Pat. No. 3,173,864 to Freedman discloses compositions containing a combination of a chromate salt and a lignosulfonate to remove rust from metal surfaces. Additionally, the composition may contain organic acids such as gluconic acid, citric acid or ethylenediaminetetraacetic acid. The use of chromate salts in a rust remover composition is not desirable from environmental and health viewpoints. The U.S. Environmental Protection Agency lists hexavalent chromium as a hazardous waste. It is toxic and is a cancer suspect agent. The citric acid is not used in combination with an alkali metal hydrogen citrate, which would provide a more effective rust-removing composition.

U.S. Pat. No. 4,529,450 to Panayappan discloses a rust-removing composition for metal surfaces which contains erythorbic acid (isoascorbic add), a water soluble polymer, a surfactant, a buffer, and optionally ascorbic acid and citric acid. This composition would be significantly more effective if it contained an alkali metal hydrogen citrate in combination with the citric acid.

British patent 1,203,722 to Squire discloses a rust-removing composition for metal surfaces comprised of the ammonium salt of an aliphatic polybasic alpha-hydroxy carboxylic acid (specifically ammonium citrate), an alkali metal phosphate, an anti-mold agent, water, and an inorganic acid selected from the group consisting of sulfuric and phosphoric acid. No mention or claim is made for the use of the alkali metal salts of citric acid in place of the ammonium salts. The phosphoric and sulfuric acids used in the composition of British patent 1,203,722 are neutralized by other ingredients in this composition. My calculations show that the actual rust-removing composition does not contain a strong mineral acid, but it does contain environmentally undesirable phosphates and sulfates.

East German patent 49,119 to Winkler and Harzbecker discloses a rust-removing composition for metal surfaces containing alkali metal citrate or ammonium citrate in water. This patent claims that if one uses the alkali metal citrate or ammonium citrate in a 3–5 fold amount relative to the amount of rust to be removed, then the composition will be effective at low concentrations, less than 3% titrates in water; no examples of the use of alkali metal citrates or alkali metal hydrogen citrates are provided. The one example given employs 0.5% ammonium citrate in water. I have found that rust-removing compositions based on citrate salts are most efficient at citrate concentrations above 5 wt. % in water, even if a 3–5 fold excess of the rust remover is present (see Example 9). More importantly, the East German patent fails to recognize the critical importance of the ratio of dibasic citrates, monobasic citrates, and citric acid to each other for rust-removing efficiency. Thus in the only example given in the East German patent, a 0.5% aqueous solution of 1000 Kg citric acid and 500 L of 25% ammonia water is used to remove rust. My calculations show that when dissolved in water, the citric acid and ammonia in this example react to give monoammonium citrate and diammonium citrate in a molar ratio of 2.58/1. This ratio will not provide optimal rust removing efficiency because it does not contain enough monoammonium citrate relative to diammonium citrate. It should contain at least 4 moles monoammonium citrate for each mole of diammonium citrate for optimum efficiency.

Japanese patent 56-72163 to Mitsubishi Heavy Industries, Ltd., discloses that steel may be descaled by immersing it in an aqueous organic acid solution of pH 3–3.5, said acid solution also containing a corrosion inhibitor. Organic acids claimed to be useful include glycolic acid, gluconic acid, malic acid, and citric acid. They are employed in water at 2–4 wt.%, an amount which is too small for optimum rust-removing efficiency. When these organic acids are dissolved in water, the pH of the solution will be lower than specified by the Japanese patent. The pH is adjusted to the specified pH 3–3.5 by addition of ammonium hydroxide. Thus in the Japanese patent, an aqueous 3% citric acid solution (pH ~2.2) containing corrosion inhibitor is adjusted to pH 3 by adding ammonium hydroxide. My calculations show that the citric acid and ammonium hydroxide will react to give, in this example, a scale-removing mixture comprised of water, corrosion inhibitor, citric acid and monoammonium hydrogen citrate. No mention or claim is made in the Japanese disclosure for the use of any base except ammonium hydroxide to adjust pH or for the use of corresponding sodium or potassium citrates in place of the monoammonium hydrogen citrate. The inherent disadvantages of the ammonium salts are described below.

In practice, most rust-removing compositions that avoid use of strong mineral acids employ a monocarboxylic acid such as ascorbic acid, erythorbic acid, gluconic acid, or glycolic add, or a polycarboxylic acid such as citric acid, oxalic acid, malic acid, or tartaric acid, or the corresponding ammonium salts as the essential, active ingredient. The free carboxylic acids are not very effective as rust removers. For example, U.S. Pat. No. 4,824,589 to Magyar, et al., discloses a rust-removing composition for metal surfaces comprising ascorbic acid, lignin sulfonate, a water-soluble polymer, and optionally a thickener. The inventors admit (column 7, lines 50–58) that a phosphoric-acid-based rust remover removed more rust than the ascorbic-acid-based rust remover of their invention.

The ammonium salts, including those in the patents discussed above, have certain disadvantages which can be avoided by using the alkali metal salts of the present invention. First, to prepare the ammonium salts requires the use of either gaseous ammonia or, more likely, ammonia in water solution (ammonium hydroxide). In either case, the ammonia has an intense, pungent, suffocating odor, necessitating special safeguards for both workers and the environment. Inhalation of concentrated ammonia vapor causes edema of the respiratory tract, spasm of the glottis and asphyxia. Treatment must be prompt to prevent death. Even 10% ammonia water is irritating to the eyes and mucous membranes. Second, ammonium salts of carboxylic acids are unstable relative to the corresponding alkali metal (sodium or potassium) salts. For example, ammonium acetate decomposes on heating, with loss of ammonia. Diammonium tartrate is known to lose ammonia slowly on exposure to air. Ammonium caprylate decomposes slowly on standing, with loss of ammonia. If one prepares an aqueous solution of ammonium citrate according to U.S. Pat. No. 2,428,364 to Frager, then heats it at 50°–80° C. and places pH indicator paper in the vapor space above it, the pH paper shows a basic reaction. This indicates escape of ammonia from the solution; the water solution itself is acidic when tested with the same pH paper. Thus a rust-removing composition containing the ammonium salts of carboxylic acids is unstable, undergoing a change in composition as ammonia is lost to the environment. Still another disadvantage of the ammonium salts of carboxylic acids, such as citric acid, is the difficulty and expense of producing the ammonium salts in dry form. This translates into higher costs for the consumer who desires to purchase and store the rust-removing composition in dry form, later dissolving it in water.

OBJECTS AND ADVANTAGES

It would be advantageous to produce a rust-removing composition that does not have the aforementioned disadvantages of prior-art rust removers. Accordingly, several objects and advantages of the present invention are:

(a) to provide a rust-removing composition which avoids the toxicity, health hazards, and environmental hazards of strong mineral acids such as hydrochloric acid, phosphoric acid, sulfuric acid, and hydrofluoric acid;

(b) to provide a rust-removing composition which, unlike strong mineral acids, is minimally corrosive to metal surfaces, concrete, and the siliceous surfaces of natural stone;

(c) to provide a rust-removing composition which is more effective and has fewer disadvantages than prior-art compositions based on carboxylic acids and their ammonium salts;

(d) to provide a rust-removing composition that avoids the hazards involved in producing rust removers based on the ammonium salts of carboxylic acids;

(e) to provide a rust-removing composition that avoids the instability of rust removers based on the ammonium salts of carboxylic acids;

(f) to provide a rust-removing composition that can be furnished to the consumer in either liquid form or dry form, said dry form being dissolved in water before use;

(g) to provide a rust-removing composition which is sufficiently safe for consumer use; that is, which does not require the use of special clothing, eye protection, breathing apparatus, or special ventilation equipment;

(h) to provide a rust-removing composition which may be removed by washing with water;

(i) to provide a rust-removing composition that can be prepared from readily available and inexpensive materials;

(j) to provide a rust-removing composition which optionally may be thickened for use on non-horizontal surfaces;

(k) to provide a rust-removing composition in which the organic components are known to be biodegradable and in which any inorganic components are known to be environmentally inert and benign.

Further objects and advantages of the present invention will become apparent as the description thereof proceeds.

SUMMARY OF THE INVENTION

In satisfaction of the foregoing objects and advantages, there is provided by the present invention a novel rust-removing composition comprising 5 to 30 weight percent active ingredients and a balance of water, said active ingredients comprising alkali metal hydrogen titrates and optionally citric acid. The composition may also include optionally a thickener, a preservative, a surfactant, a coloring agent, or a corrosion inhibitor.

Also provided by the present invention is a method of removing rust from rusted metal surfaces, concrete surfaces, and the siliceous surfaces of natural stone, which comprises applying the composition of the present invention to the surface, allowing said composition to remain on the surface until most or all of the rust has been loosened and dissolved, and removing said composition and dissolved rust by washing with water.

DESCRIPTION OF THE PREFERRED EMBODIMENTS

As set forth above, the composition of the present invention includes alkali metal hydrogen citrates, water, optionally citric acid, and optionally a thickener. Other optional components include surfactants, coloring agents, or corrosion inhibitors. Citric acid and the alkali metal hydrogen citrates described herein are nontoxic, biodegradable, mild acids. Citric acid itself is widely distributed in plants and in animal tissues and fluids. It is widely used as an acidulant in beverages and confectionery and for other purposes in a wide variety of foods and pharmaceuticals. Some of its salts, especially the sodium salt, are likewise used in foods and pharmaceuticals. For example, Alka-Seltzer® brand antacid in water contains the antacid sodium citrate. Thus citric acid combined with certain of its alkali metal salts or certain of the alkali metal salts alone provide inexpensive, biodegradable materials for a rust-removing composition which is safe for consumer use.

Aqueous citric acid alone will remove some of the rust from a metal surface and has been used in the prior art as a rust remover. Given that citric acid is more acidic than the composition of the present invention, that citric acid is known to be a metal-sequestering agent, and that ferric citrate is soluble in water, it is surprising that the combination of alkali metal hydrogen citrates, with or without citric acid, as described herein, will remove rust significantly faster and to a greater extent than will citric acid alone. This result would not have been predicted even by those skilled in the art. One way to prepare the composition of the present invention is to mix measured amounts of trisodium citrate (or tripotassium citrate) and citric acid in a measured amount of water. The rust-removing ability of this mixture is greater than the rust-removing ability of trisodium citrate (or tripotassium citrate) alone in water or citric acid alone in water. In other words, these elements cooperate to increase overall derusting efficiency.

The alkali metal hydrogen citrates found to be useful in the present invention, when in certain particular combinations with each other and with citric acid are:

(a) monosodium hydrogen citrate,
(b) disodium hydrogen citrate,
(c) monopotassium hydrogen citrate, and
(d) dipotassium hydrogen citrate.

Not all of the above alkali metal hydrogen citrates alone, and not all combinations thereof, are useful as rust removers. Thus disodium hydrogen citrate and dipotassium hydrogen citrate are no more effective as rust removers than citric acid itself (compare disodium citrate with citric acid in Example 10). A mixture of monosodium hydrogen citrate and dipotassium hydrogen citrate, if it contains too much dipotassium hydrogen citrate, is not useful in the present invention. A mixture of monosodium hydrogen citrate and citric acid, if it contains too much citric acid, is likewise not useful in the present invention. Specific, useful alkali metal hydrogen citrates and combinations thereof selected from the above list are described below. For the sake of simplicity, these particular combinations, and combinations with citric acid, will be referred to hereinafter as the citrate composition of the invention. Also for the sake of simplicity, the sodium and potassium hydrogen citrates useful in the present invention will be described in terms of the sodium salts only. But it is to be understood that statements, claims, and examples set forth for the sodium salts of citric acid that are useful in the present invention apply equally well to the corresponding potassium salts of citric acid, mixtures thereof with the sodium salts, and mixtures thereof with citric acid.

The range of especially effective sodium hydrogen citrates and sodium hydrogen citrates/citric acid combinations useful in the present invention begins with a mixture of disodium hydrogen citrate and monosodium hydrogen citrate having a molar ratio of 1 mole disodium hydrogen citrate to 4 moles monosodium hydrogen citrate. The amount of monosodium hydrogen citrate may then be increased at the expense of disodium hydrogen citrate until the composition contains only monosodium hydrogen citrate. At this point, one may add citric acid to the monosodium hydrogen citrate until a mixture of monosodium hydrogen citrate and citric acid having a molar ratio of 1 mole monosodium hydrogen citrate to 2 moles citric acid is obtained (see Table 1). Addition of more citric acid at the expense of monosodium hydrogen citrate will decrease the rust-removing effectiveness and will reach minimal effectiveness with substantially pure citric acid (see Examples 10 and 11). In summary, an essential ingredient of the present invention comprises all conceivable mixtures of sodium hydrogen citrates and sodium hydrogen citrates/citric acid from a mixture consisting of disodium hydrogen citrate/ monosodium hydrogen citrate in a molar ratio of 1/4 to a mixture of monosodium hydrogen citrate/citric acid in a molar ratio of 1/2. This, as stated above, is referred to as the citrate composition of the invention.

The citrate composition of the invention may be prepared by any of the usual processes to produce salts of polycarboxylic acids (such as citric acid) and/or mixtures thereof with the free polycarboxylic acid. For example, sodium hydroxide, sodium bicarbonate, or sodium carbonate or the corresponding potassium bases may be added to the citric acid either before or after adding water. Use of the alkali metal hydroxide is preferred over use of the bicarbonates or carbonates. In another example, a calculated amount of the trisodium salt of citric acid may be added to a calculated amount of citric acid. Upon dissolution in water, interaction of the tricarboxylate anion and citric acid proceeds immediately, producing the desired monosodium salt, disodium salt, and free citric acid if the free acid is desired in the citrate composition.

In a preferred embodiment, the essential citrate composition of the present invention varies from substantially pure monosodium hydrogen citrate to mixtures of monosodium hydrogen citrate and citric acid wherein the maximum amount of citric acid is present when the ratio is 1.5 moles monosodium hydrogen citrate to 1.0 mole citric acid, i.e., 62.6 wt. % monosodium hydrogen citrate and 37.4 wt. % citric acid (Table 2). This preferred variation in molar ratio of monosodium hydrogen citrate to citric acid also applies to the variation in molar ratio of monopotassium hydrogen citrate to citric acid. Likewise, in place of 1.5 moles monosodium hydrogen citrate/1.0 mole citric acid, one may use 1.5 moles (monosodium and monopotassium hydrogen citrate)/1.0 mole citric acid, wherein the total amount of the two citrate salts equals 1.5 moles.

In a further preferred embodiment of the invention, the essential citrate composition is comprised of sodium salts rather than potassium salts. While the two salts are approximately equally effective in removing rust, the potassium salts are more expensive than the corresponding sodium salts.

A second essential ingredient of the present invention is water, for without dissolving the citrate composition in water, it will not remove rust. The citrate composition may be delivered to the user dissolved in water or in dry form. But to use it to remove rust, the user must first dissolve the dry citrate composition in water. Ordinary drinking water, i.e. tap water, may be used instead of the more expensive distilled water or deionized water. It has been found that the essential citrate composition may be present in the water in broadly varying amounts, from 5 wt. % to 30 wt. %. Amounts greater than 30 wt. % will not increase the rust-removing effectiveness and would be unnecessarily expensive. In a preferred embodiment, the citrate composition of the present invention varies from 10 wt. % to 20 wt. %.

The rate of rust removal caused by the citrate composition of the present invention is affected by temperature. The higher the temperature, the faster the rate of rust removal. As an example, a heavily rusted panel of hot-rolled carbon steel, 12.7 cm×21.6 cm×0.32 cm thick, when immersed in a solution containing water and 15 wt. % of the preferred citrate composition, was derusted in 1.5 hours at 25° C. A second identical panel was derusted in the same solution in only 10 minutes at 90°–93° C. While it is known that the composition of the present invention will remove rust at 10° C. and probably at lower temperatures, a preferred temperature range is 20°–90° C.

In a further embodiment of the invention, it is desirable to include a thickening agent in the composition when an increase in viscosity of the mixture is needed, for example when the composition is used to remove rust from a non-horizontal surface. Suitable thickening agents include biodegradable natural polymers and biodegradable derivatives thereof such as cellulose ethers, cellulose esters, sodium carboxymethylcellulose, starch, starch ethers and esters, and polysaccharides including xanthan gum. Other acceptable thickeners include lignin sulfonates, synthetic polymers such as those based on acrylic acid or methacryclic acid, and inorganic clays or aluminas such as kaolin clay or boehmite alumina which are environmentally benign. Specifically preferred materials include starch, hydroxyethylcellulose and boehmite alumina. The amount of thickening agent which should be used depends on the specific thickener and the degree of thickening required and will generally be in the range of about 0.1% to 7.0% by weight.

TABLE 1

| Citrate Composition Broad Range of Effectiveness: Continuous variation from A to B to C. | | | |
|---|---|---|---|
| A. Disodium hydrogen citrate | 1 mole (21.6 wt. %) | Monosodium hydrogen citrate | 4 moles (78.4 wt. %) |
| B. Monosodium hydrogen citrate | 100 wt. % | | |
| C. Monosodium hydrogen citrate | 1 mole (35.8 wt. %) | Citric acid | 2 moles (64.2 wt. %) |

TABLE 2

| Citrate Composition Preferred Range: Continuous variation from A to B. | | | |
|---|---|---|---|
| A. Monosodium hydrogen citrate | 100 wt. % | | |
| B. Monosodium hydrogen citrate | 1.5 moles (62.6 wt. %) | Citric acid | 1.0 mole (37.4 wt. %) |

It has been found that the essential ingredients of the present invention may be present in broadly varying proportions to each other, and still comprise an effective rust-removing composition. When thickening is desired, the thickener must be considered essential. In this case the three essential ingredients of the present invention may be present in the following amounts:

| Citrate composition | 5–30 wt. % |
|---|---|
| Water | 70–95 wt. % |
| Thickener | 0.1–7.0 wt. % |

Preferably the essential ingredients are present in the following amounts:

| Citrate composition | 10–20 wt. % |
|---|---|
| Water | 80–90 wt. % |
| Thickener | 0.1–7.0 wt. % |

Under certain circumstances, dilute solutions of citric acid and citric acid/citrate salt mixtures can ferment or permit mold growth. Thus it is sometimes desirable to add a preservative to the formulation in amounts from 0.1 to 3.0 wt. %. Useful preservatives include sodium sulfite, sodium chloride, propylene glycol, benzoic acid, acetic acid, sodium benzoate, propionic acid and sodium propionate. These preservatives are nontoxic at low concentrations, and are used in foods for human consumption. For that reason, they are preferred over other, more toxic preservatives, such as formaldehyde or a phenolic mercurial acetate.

When derusting metal surfaces, it is desirable to incorporate into the formulation a corrosion-inhibiting component in order to increase the time that a cleaned, rust-free metal surface remains rust free. The corrosion inhibitor may be any water soluble organic or inorganic corrosion inhibitor in amounts of 0.05 to 1.0 wt. %. These include benzotriazole, sodium nitrate, thiourea, and organic monocarboxylic acids and their salts. The organic monocarboxylic acids and their alkali metal or alkaline earth salts are preferred because they are generally nontoxic and biodegradable.

Coloring agents may be added optionally to the formulation. The preferred colorants are those approved by the U.S. Food and Drug Administration for use in foods, drugs, and cosmetics. These are water soluble, safe, and stable in the formulations of the present invention.

If desired, the formulation can include optionally a surfactant. The surfactant will remove oils and greases from the rusty surface and emulsify them in the formulation. Preferably these would be selected from among those well known in the detergent industry, especially the biodegradable anionic, nonionic and amphoteric surfactants that might be employed in, for example, a dishwashing formulation. These include sodium dodecylbenzenesulfonate, sodium lauryl sulfate, ethoxylated alcohols, ethoxylated alkyl phenols, alkylaminopropionates, and lauryl dimethyl glycine. The surfactants, and combinations thereof, can be present in amounts of 0.1 to 10 wt. %.

The present invention also provides methods for the application of the composition to rusted surfaces. The composition may be brushed, sprayed, or applied by dipping, to rusted metal surfaces, concrete surfaces, and siliceous surfaces of natural stone. If thickened, it will remain on a non-horizontal surface to effect derusting. This is a particularly useful feature when cleaning vertical surfaces or rusty objects that cannot be dipped into the unthickened composition. Derusting vertical surfaces or objects which cannot be dipped is a problem for powder and free flowing liquids as in U.S. Pat. No. 4,529,450. The present invention overcomes this difficulty.

Once applied, the composition is allowed to remain on the surface until substantially all of the rust has been loosened and dissolved. This requires 10 minutes to several hours, depending on the severity of the rust and the temperature at which the cleaning is conducted. The derusted surface is then washed with water to remove the composition, loosened rust and dissolved rust.

In cases where the surface is severely rusted, more than one application of the composition of the present invention may be required. Mechanically removing loose rust and scale, for example by wire brushing, prior to application of the rust-removing composition usually reduces the number of applications required to remove all of the rust.

The following examples are presented to illustrate the invention, but the invention is not to be considered as limited thereto.

EXAMPLE 1

Comparison to hydrochloric acid (muriatic acid). A citrate composition containing 28.39 g (0.133 mole) monosodium hydrogen citrate and 2.31 g (0.012 mole) citric acid was prepared in water so that the water contained 15 wt. % of the citrate composition. The pH of the solution was 3.7. A sufficient amount was prepared to completely immerse seven heavily rusted test panels of hot-rolled carbon steel 12.7 cm×21.6 cm×0.32 cm thick. The surface rust on these test panels was 4.5–5.0 mils thick (0.0114 cm–0.0127 cm). The seven panels were spaced about 0.64 cm apart in the test chamber and immersed in the aqueous citrate composition. The rusty test panels were soaked for 1.5 hours at 25°–27° C., then washed with water. All seven test panels were substantially free of rust.

A sample of a commercially available rust remover, "Harvey's 1000 Scale and Rust Remover" from Harvey's Universal, Inc., Torrance, Calif., was obtained. This product contains 20 wt. % hydrochloric acid and an anionic surfactant. It was diluted according to specific label directions, namely 1 gallon of product to 20 gallons of water. The resultant derusting solution was strongly acidic, with a pH of about 1.0. The same test on seven rusty test panels as described above was conducted at the same temperature except the test panels were soaked in the hydrochloric acid solution for 2.0 hours instead of 1.5 hours. After washing with water, all seven test panels had at least half the rust remaining on their surfaces.

A third identical test (1.5 hours) was conducted using the undiluted, concentrated product from Harvey's Universal, Inc. containing 20 wt. % of hydrochloric acid. The test was conducted in a well-ventilated area to avoid breathing the pungent, irritating acid fumes. In this case, substantially all of the rust was removed from the seven test panels. It is well-known that concentrated solutions of hydrochloric acid will remove rust; but it is not safe for the consumer in this form.

EXAMPLE 2

Comparison to a commercial citric acid rust remover. A commercially available rust remover, "Rust Erad 2X" from MacDermid Inc., Waterbury, Conn., was obtained. This product contains water, citric acid and a surfactant. The label directs that it be diluted 1/1 with water. To give this product the greatest chance to succeed, it was tested at full strength, undiluted, as described in Example 1 using one rusty test panel as described therein. The undiluted Rust Erad 2X had a pH of about 2.0. The test temperature was 25° C. After five hours of soaking in this product, the panel still had substantial rust on its surfaces. After nine hours of soaking, the panel was substantially rust free. In Example 1, in which a citrate composition of the present invention was employed, the panels were free of rust in 1.5 hours.

EXAMPLE 3

Comparison to reagent grade citric acid solution. A citrate composition containing 41.97 g (0.196 moles) monosodium hydrogen citrate and 6.52 g (0.034 moles) citric acid was dissolved in 236.5 g water. This solution contained 17.0 wt. % citrate composition. On a molar basis, the aqueous solution contains 0.230 moles of citrate composition of which 85.24 mole % is monosodium hydrogen citrate and 14.76 mole % is citric acid.

A second test solution containing 44.19 g (0.230 moles) pure citric acid and 236.5 g water was prepared. This solution contained 15.7 wt. % citric acid but the same number of moles of active rust remover as that of the citrate composition just described. This allows direct comparison of their derusting ability.

The two test solutions in this example were tested for rust removing ability against two different rusty test specimens. The first test specimens were square 1.1 cm×1.1 cm×0.45 cm thick steel nuts which had been stored together and were equally rusty. The second test specimens were rusty sheet metal squares approximately 5.1 cm×5.1 cm×0.0508 cm (20 mils) thick. In each case, the rusty test specimens were washed in water to remove dirt, rinsed in acetone, and dried in a hot air stream. After cooling to room temperature, they were then weighed on an analytical balance. After immersion in the test solution for the specified times, the specimens were again washed with water, then acetone, and dried in a hot air stream. After cooling, they were again weighed on the analytical balance. The loss in weight represents the amount of rust removed. In the past, lemon juice was used to remove rust spots from the steel or iron surfaces of ships. Since lemon juice contains citric acid and ascorbic acid, it was likewise evaluated for its rust-removing efficiency. U.S. Pat. No. 4,824,589 to Magyar et al. claims ascorbic acid as a rust remover. ReaLemon® brand natural strength lemon juice from concentrate, sold by Borden Inc., Columbus, Ohio, was used in this test. The citrate composition and citric acid solutions were tested at 20° C. while the lemon juice was tested at 24° C. Results show that the citrate composition of the present invention is superior to citric acid and to lemon juice in removing rust.

| Rusty nuts test temp = 14° C. | Citrate Compostion | Citric Acid |
| --- | --- | --- |
| Weight before test (g) | 3.3134 | 3.3024 |
| Weight after test (g) | 3.3000 | 3.2944 |
| Weight loss (%) | 0.40 | 0.24 |
| Visual | Rust free | Remains rusty |

| Rusty sheet metal, test temp. = 20° C. | Citrate composition | Citric acid | Lemon juice, test temp = 24° C. |
| --- | --- | --- | --- |
| Weight before test (g) | 7.9442 | 7.9505 | 5.4382 |
| Weight after 1 hr. (g) | 7.6503 | 7.8640 | 5.3749 |
| Weight loss (%) | 3.70 | 1.09 | 1.16 |
| Weight after 2 hrs. (g) | 7.4223 | 7.7108 | 5.3166 |
| Weight loss (%) | 6.57 | 3.01 | 2.24 |
| Visual | Almost rust free | Substantial rust remains | Substantial rust remains |

EXAMPLE 4

Effect of temperature on derusting rate. The aqueous citrate composition, the rusty test panels, and test procedure identical to those described in Example 1 were employed in a first test to evaluate the effect of temperature on the rate of derusting. A test panel was immersed in the aqueous citrate composition at 25°–27° C. It was free of rust after soaking for 1.5 hours. However, when soaked at 90°–93° C., an identical test panel was rust free in 10 minutes.

In a second test, the aqueous citrate composition, identical rusty sheet metal squares, and the test procedure as described in Example 3 were employed to study the effect of temperature.

| | Aq. citrate composition as in Example 3 | |
| --- | --- | --- |
| Rusty sheet metal as in Example 3 | 18–20° C. | 70–75° C. |
| Weight before test (g) | 5.4013 | 5.4133 |
| Weight after 10 min. (g) | 5.3810 | 5.2325 |
| Weight loss (%) | 0.38 | 3.34 |
| Weight after 20 min. (g) | 5.3684 | 5.1639 |
| Weight loss (%) | 0.61 | 4.61 |
| Weight after 30 min. (g) | 5.3491 | 4.6496 |
| Weight loss (%) | 0.97 | 14.12 |
| Weight loss after 3 hours (g) | 5.1771 | no change |
| Weight loss (%) | 4.15 | no change |

The examples show that temperature strongly affects the rate of derusting and that the higher the temperature, the faster the derusting rate.

EXAMPLE 5

To study the relative rust removing ability of monosodium hydrogen citrate, disodium hydrogen citrate, and trisodium citrate, three test solutions were prepared: (1) 49.19 g (0.230 moles) monosodium hydrogen citrate and 236.5 g water, (2) 54.25 g (0.230 moles disodium hydrogen citrate and 236.5 g water, and (3) 67.60 g (0.230 moles) trisodium citrate and 236.5 g water. Thus each test solution contains the same amount of rust remover on a molar basis dissolved in the same amount of water. The rusty test specimens and test procedure as described in Example 3 were employed.

| Rusty sheet metal test temp. = 20° C. | Monosodium hydrogen citrate | Disodium hydrogen citrate | Trisodium citrate |
| --- | --- | --- | --- |
| Weight before test (g) | 6.2643 | 6.3641 | 6.5403 |
| Weight after 1 hr. (g) | 5.9700 | 6.2990 | 6.5325 |
| Weight loss (%) | 4.70 | 1.02 | 0.12 |
| Weight after 2 hrs. (g) | 5.7925 | 6.1720 | 6.5267 |
| Weight loss (%) | 7.53 | 3.02 | 0.21 |
| Visual | Rust free | Substantial rust remains | Heavy rust remains |

The test results show that monosodium hydrogen citrate is clearly superior to disodium hydrogen citrate and trisodium citrate in its ability to remove rust. Disodium hydrogen citrate appears to be no more effective than citric acid (see Example 3), and trisodium citrate is essentially not effective in removing rust.

EXAMPLE 6

Comparison to phosphoric acid. A commercially available phosphoric acid-based rust remover known as Naval Jelly® brand rust dissolver, manufactured by Loctite Corp., Cleveland, Ohio, was obtained. This product is a thickened, gel-like material. Therefore two thickened versions of the citrate composition were prepared for direct comparison to Naval Jelly®: (1) a clear, colorless gel prepared from 94.6 g water, 2.8 g hydroxyethylcellulose and 17.32 wt. % of a mixture of monosodium hydrogen citrate and citric acid, of which 85.11 mole % is monosodium hydrogen citrate and 14.89 mole % is citric acid, and (2) a white cream containing 92.5 g water, 13.0 g boehmite alumina, 0.58 g sodium chloride, and 21.0 g (16.4 wt. %) of a mixture of monosodium hydrogen citrate and citric acid, of which 75.62 mole % is monosodium hydrogen citrate and 24.38 mole % is citric acid.

Rusty test specimens as described in Example 3 were employed. Cleaning and weighing of the test specimens is also described therein. When the test specimens were coated with the thickened rust removers and hung in the air by means of alligator clips, the Naval Jelly® sagged and dripped from the end of the test specimen. Therefore the test specimens were immersed in the rust removers contained in glass beakers.

| Rusty sheet metal Test temp. = 20° C. | Citrate composition | | Naval Jelly ® |
| --- | --- | --- | --- |
| | clear gel | white cream | (phosphoric acid) |
| Weight before test (g) | 6.5265 | 6.4000 | 6.1100 |
| Weight after 1 hr. (g) | 6.2983 | 6.1375 | 5.9383 |
| Weight loss (%) | 3.50 | 4.10 | 2.81 |
| Weight after 2 hrs. (g) | 6.0740 | 5.9237 | 5.7873 |
| Weight loss (%) | 6.93 | 7.44 | 5.28 |
| Visual | ~90% rust removed | ~95% rust removed | ~69% rust removed |

After determining that the clear gel removed about 90% of the rust from the test specimen, the percent rust removed by the remaining two rust removers was calculated from their percent weight loss relative to the weight loss produced by the clear gel.

A second comparison to Naval Jelly® was conducted using different rusty test specimens. In this case the specimens were heavily rusted mild steel rectangles about 5.1 cm×2.2 cm×0.16 cm thick. A thickened opaque gel was prepared which contained 171.7 g water, 8.0 g cornstarch, 19.81 g monosodium hydrogen citrate, and 9.06 g citric acid. The gel thus contains 13.84 wt. % of the citrate composition, of which 66.24 mole % is monosodium hydrogen citrate and 33.76 mole % is citric acid. The samples were immersed in the thickened rust removers. The usual test procedure was employed.

| Steel Rectangles<br>Test temp. = 25° C. | Citrate composition<br>opaque gel | Naval Jelly®<br>(phosphoric acid) |
|---|---|---|
| Weight before test (g) | 10.0874 | 10.7740 |
| Weight after 1 hr. (g) | 9.8855 | 10.6506 |
| Weight loss (%) | 2.00 | 1.15 |
| Weight after 2 hrs. (g) | 9.7112 | 10.5737 |
| Weight loss (%) | 3.73 | 1.86 |
| Visual | Rust free | Rust remains |

Clearly, the citrate composition of the present invention is superior to Naval Jelly® brand rust dissolver in its rust removing ability.

EXAMPLE 7

Rust loss caused by handling procedure. To be sure that rust is being removed by the rust removers rather than by the handling procedure itself as described in Example 3, a rusty steel rectangle as described in Example 6 was cleaned, dried, weighed, and immersed in water at 25° C. for two hours. After cleaning, drying, and again weighing the steel rectangle, its weight loss was found to be only 0.03%.

EXAMPLE 8

Base metal attack. To examine the relative corrosivity towards base metal of phosphoric acid, hydrochloric acid, and the citrate composition of the present invention, the rusty steel rectangles described in example 6 were cleaned mechanically using a grinding wheel to give bright, shiny, rust free surfaces. These were immersed in Naval Jelly® brand rust dissolver, 15 wt. % hydrochloric acid, and the citrate composition described in Example 3. The usual test procedure was employed.

| Rust free steel<br>test temp. = 24° C. | Naval Jelly®<br>(phosphoric acid) | Hydrochloric<br>acid | Citrate<br>composition |
|---|---|---|---|
| Weight before test (g) | 8.9996 | 7.9495 | 7.8673 |
| Weight after 2 hrs. (g) | 8.9724 | 7.8343 | 7.8596 |
| Weight loss (%) | 0.30 | 1.45 | 0.10 |

The citrate composition of the present invention is less corrosive to the base metal than either phosphoric acid or hydrochloric acid.

EXAMPLE 9

Concentration effect. To study the effect of the concentration of the citrate composition in water on its rust removing ability, a solution containing 167.29 g (0.781 moles) monosodium hydrogen citrate, 26.48 g (0.138 moles) citric acid, and 775.1 g water was prepared. This solution contains 20 wt. % of the citrate composition, of which 84.98 mole % is monosodium hydrogen citrate and 15.02 mole % is citric acid. Some of this solution was set aside for derusting tests. The remainder was diluted with water to give solutions containing 15 wt. %, 10 wt. %, and 5 wt. % of the citrate composition. For this experiment, the rusty mild steel rectangles as described in Example 6 were used. The usual test procedure was employed.

| Steel rectangles | Citrate composition | | | |
|---|---|---|---|---|
| test temp. = 17° C. | 5% | 10% | 15% | 20% |
| Weight before test (g) | 9.2814 | 9.6029 | 9.4339 | 9.4641 |
| Weight after 1 hr. (g) | 9.2652 | 9.5909 | 9.4104 | 9.4366 |
| Weight loss (%) | 0.17 | 0.13 | 0.25 | 0.29 |
| Weight after 2 hr. (g) | 9.2253 | 9.5715 | 9.3561 | 9.3901 |
| Weight loss (%) | 0.60 | 0.33 | 0.82 | 0.78 |
| Weight after 3 hr. (g) | 9.1685 | 9.5400 | 9.2788 | 9.3015 |
| Weight loss (%) | 1.22 | 0.67 | 1.64 | 1.72 |
| Weight after 21 hrs. (g) | 8.2725 | 8.5516 | 8.3857 | 8.3789 |
| Weight loss (%) | 10.87 | 10.95 | 11.11 | 11.47 |

Derusting was slow in this test because of the low test temperature. But the data show that 5 wt. % of the citrate composition is almost as effective as 20 wt. % in removing rust.

A second test was conducted using higher temperatures and lower concentrations. The same rusty steel rectangles as just described were used. One citrate composition was monosodium hydrogen citrate while a second citrate composition contained monosodium hydrogen citrate and citric acid in a molar ratio of 2 moles monosodium hydrogen citrate to 1 mole citric acid. The usual test procedure was employed. The two citrate compositions were both diluted with water to 1 wt. % and 5 wt. %.

| Steel rectangles | Monosodium hydrogen<br>citrate | | Monosodium hydrogen<br>citrate/citric acid | |
|---|---|---|---|---|
| test temp. = 24° C. | 1% | 5% | 1% | 5% |
| Weight before test (g) | 8.8500 | 8.5880 | 9.2745 | 8.9250 |
| Weight after 2 hrs. (g) | 8.8258 | 8.3773 | 9.2484 | 8.7181 |
| Weight loss (%) | 0.27 | 2.45 | 0.28 | 2.32 |

These data show that 5 wt. % of the citrate composition is significantly more effective than 1 wt. % in removing rust.

EXAMPLE 10

Effect of the ratio of citrate salts to citric acid. This study was conducted to examine the effect on rust removal of the ratio of sodium citrate salts to citric acid in the citrate composition. The rusty sheet metal squares and the test procedure are described in Example 3. Each of the 13 test solutions contained 15 wt. % of the citrate composition in water. The citrate composition was varied from pure trisodium citrate to pure citric acid as shown in the following table. The rusty sheet metal squares were immersed in the test solutions for 2 hours at 22° C. The usual test procedure was used. For clarity, the actual weights of the metal squares are not given. Instead, only their per cent weight loss (rust removed) after the 2-hour soak is given.

| Citrate composition | Molar<br>ratio | Rusty sheet metal<br>weight loss (%) |
|---|---|---|
| 1. Trisodium citrate | — | 0.28 |
| 2. Trisodium citrate | 1.30 | 2.37 |
|    Disodium hydrogen citrate | 1.00 | |
| 3. Trisodium citrate | 1.00 | 4.61 |
|    Disodium hydrogen citrate | 4.95 | |
| 4. Disodium hydrogen citrate | — | 6.14 |
| 5. Disodium hydrogen citrate | 4.36 | 6.56 |
|    Monosodium hydrogen citrate | 1.00 | |
| 6. Disodium hydrogen citrate | 1.00 | 6.65 |

| Citrate composition | Molar ratio | Rusty sheet metal weight loss (%) |
|---|---|---|
| Monosodium hydrogen citrate | 1.07 | |
| 7. Disodium hydrogen citrate | 1.00 | 8.48 |
| Monosodium hydrogen citrate | 4.38 | |
| 8. Monosodium hydrogen citrate | — | 8.18 |
| 9. Monosodium hydrogen citrate | 10.17 | 8.44 |
| Citric acid | 1.00 | |
| 10. Monosodium hydrogen citrate | 1.92 | 9.58 |
| Citric acid | 1.00 | |
| 11. Monosodium hydrogen citrate | 1.00 | 8.28 |
| Citric acid | 1.38 | |
| 12. Monosodium hydrogen citrate | 1.00 | 7.39 |
| Citric acid | 3.87 | |
| 13. Citric acid | — | 6.71 |

A second molar ratio test was performed using different rusty test specimens, namely the rusty mild steel rectangles as described in Example 6 and twice as much soaking time as in the example just described. The test temperature was 22° C. The usual test procedure was used (Example 3). As in the previous example, each of the test solutions contained 15 wt. % of the citrate composition in water.

| Citrate composition | Molar ratio | Soaking time (hours) | Steel rectangles weight loss (%) |
|---|---|---|---|
| 1. Trisodium citrate | — | 3 | 0.04 |
| 2. Monosodium hydrogen citrate | — | 2 | 1.79 |
|  |  | 3 | 3.44 |
|  |  | 4 | 5.00 |
| 3. Monosodium hydrogen citrate | 2.00 | 2 | 1.74 |
| Citric acid | 1.00 | 3 | 3.44 |
|  |  | 4 | 5.11 |
| 4. Citric acid | — | 2 | 0.68 |
|  |  | 3 | 1.37 |
|  |  | 4 | 2.10 |

A repeat of this test using 10 wt. % citrate composition and citric acid instead of 15 wt. % gave essentially the same results. The data show that trisodium citrate is ineffective as a rust remover, that disodium hydrogen citrate is about as effective as citric acid, and that the most effective rust removers comprise mixtures of disodium hydrogen citrate/monosodium hydrogen citrate, monosodium hydrogen citrate alone, and mixtures of monosodium hydrogen citrate/citric acid.

EXAMPLE 11

Citrate composition containing potassium salts. Citrate compositions were prepared using potassium salts of citric acid and their rust removing ability was compared to that of citric acid. Each of the test solutions contained 15 wt. % of the citrate composition in water. Rusty steel rectangles as described in Example 6 were used. The usual test procedure was used. The test temperature was 30° C.

| Citrate composition | Molar ratio | Soaking time (hours) | Steel rectangles weight loss (%) |
|---|---|---|---|
| 1. Monopotassium hydrogen citrate | — | 2 | 3.44 |
|  |  | 3 | 5.80 |
| 2. Monopotassium hydrogen citrate | 2.00 | 2 | 3.20 |
| Citric acid | 1.00 | 3 | 5.38 |
| 3. Citric acid | — | 2 | 0.95 |
|  |  | 3 | 1.95 |

The data show that the potassium hydrogen citrate compositions are more effective than citric acid alone.

EXAMPLE 12

Removal of rust stain from concrete. A citrate composition was prepared as follows: sodium hydroxide (7.6 g) was dissolved in 116.0 g water at room temperature. In a separate container, 12.3 g of corn starch was dispersed finely in 116.0 g water at room temperature by stirring it manually for about one minute. The aqueous sodium hydroxide was added rapidly to the aqueous corn starch dispersion at room temperature. The mixture gelled immediately. It was stirred manually for about 5 minutes. To the gel, 36.7 g citric acid was added, and the mixture was stirred about 10 minutes to allow the citric acid to dissolve and react with the sodium hydroxide, thus producing a thickened composition containing monosodium hydrogen citrate. To this was added 8.6 g sodium chloride and 2.9 g acetic acid to inhibit mold growth, and the mixture was stirred about 5 minutes to allow the salt and acetic acid to dissolve. The resultant viscous mixture contained 13.6 wt. % monosodium hydrogen citrate.

The citrate composition was applied to a rust stain on the concrete surface of an automobile parking lot at an ambient air temperature or 27° C. and was allowed to remain in place for one hour. Every 20 minutes the citrate composition was stirred to ensure good contact with the rust stain and to expose the rust to fresh citrate composition. After one hour the test area was scrubbed for approximately 1 or 2 minutes with a household scrub brush. Finally the citrate composition and dissolved rust were hosed away from the test area with a stream of water. The concrete surface in the test area was rust free and clean, resembling fresh concrete.

The invention has been described herein with reference to certain preferred embodiments. However, obvious variations thereon will become apparent to those skilled in the art. Accordingly, the scope of the invention should be determined by the appended claims and their legal equivalents, rather than by the examples given.

I claim:

1. A rust-removing composition consisting essentially of 5 to 30 weight percent active ingredients and a balance of water, said active ingredients consisting essentially of alkali metal dihydrogen citrates and citric acid.

2. The composition of claim 1 wherein the alkali metal is selected from the group consisting of sodium, potassium and mixtures of sodium and potassium.

3. The composition of claim 1 wherein said alkali metal hydrogen citrate is monosodium dihydrogen citrate.

4. The composition of claim 1 wherein said alkali metal dihydrogen citrates are selected from the group consisting of monosodium dihydrogen citrate, monopotassium dihydrogen citrate, and mixtures thereof.

5. The composition of claim 1 wherein said alkali metal dihydrogen citrates consist essentially of mixtures of monopotassium dihydrogen citrate and monosodium dihydrogen citrate.

6. The composition of claim 1, further including a thickening agent, said thickening agent being present in an amount from 0.1 to 7.0 weight percent.

7. The composition of claim 6, wherein the thickening agent is selected from the group consisting of hydroxyethylcellulose, xanthan gum, starch, water-dispersible alumina, sodium carboxymethylcellulose, water-dispersible clays, and mixtures thereof.

8. The composition of claim 1, further including a corrosion inhibiting component in an amount from 0.05 to 1.0 weight percent.

9. The composition of claim 1, further including a preservative, in an amount from 0.1 to 3.0 weight percent, to protect against fermentation, mold growth, and other microbial attack.

10. The composition of claim 1, further including a surfactant, said surfactant being present in an amount from 0.1 to 10.0 weight percent.

11. A method for removing rust from rusted metal surfaces, concrete surfaces, and the siliceous surfaces of natural stone comprising the steps of:

a. applying to the surface a rust-removing composition consisting essentially of 5 to 30 weight percent active ingredients and a balance of water, said active ingredients consisting essentially of alkali metal dihydrogen citrates and optionally citric acid, and b. allowing said rust-removing composition to remain on the surface until at least 90 percent of the rust is dissolved and loosened, and c. removing said rust-removing composition together with the dissolved and loosened rust by washing with water.

12. A method for removing rust from rusted metal surfaces, concrete surfaces, and the siliceous surfaces of natural stone comprising the steps of:

a. applying to the surface a rust-removing composition consisting essentially of 5 to 30 weight percent active ingredients and a balance of water, said active ingredients consisting essentially of alkali metal dihydrogen citrates and citric acid, and b. allowing said rust-removing composition to remain on the surface until at least 90 percent of the rust is dissolved and loosened, and c. removing said rust-removing composition together with the dissolved and loosened rust by washing with water.

* * * * *